United States Patent
Lochmann et al.

(10) Patent No.: US 10,057,950 B2
(45) Date of Patent: Aug. 21, 2018

(54) BALLAST FOR LIGHTING MEANS

(71) Applicant: TRIDONIC GMBH & CO KG, Dornbirn (AT)

(72) Inventors: Frank Lochmann, Essseratsweiler (DE); Markus Mayrhofer, Dornbirn (AT); Janosch Marquart, Balzers (LI); Simon Nigsch, Sonntag (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 15/537,479

(22) PCT Filed: Apr. 12, 2016

(86) PCT No.: PCT/AT2016/050091
§ 371 (c)(1),
(2) Date: Jun. 19, 2017

(87) PCT Pub. No.: WO2016/164947
PCT Pub. Date: Oct. 20, 2016

(65) Prior Publication Data
US 2018/0027620 A1    Jan. 25, 2018

(30) Foreign Application Priority Data

Apr. 14, 2015  (DE) .................. 10 2015 206 626
Jun. 23, 2015  (EP) ......................... 15173285
Nov. 13, 2015  (AT) .................. GM336-2015

(51) Int. Cl.
H05B 33/00    (2006.01)
H05B 33/08    (2006.01)
H02M 1/42     (2007.01)

(52) U.S. Cl.
CPC ...... H05B 33/0815 (2013.01); H02M 1/4233 (2013.01)

(58) Field of Classification Search
CPC  H05B 41/2856; H05B 41/3925; H05B 41/28; H05B 41/2827; H05B 41/2886; H05B 41/295; H05B 41/298; H05B 41/2981; H05B 33/0812; H05B 41/2853; H05B 41/2985; H05B 41/2988; H05B 41/3924
See application file for complete search history.

(56) References Cited

U.S. PATENT DOCUMENTS 5,867,379 A    2/1999  Maksimovic et al.
7,256,553 B1   8/2007  Chan et al.
(Continued)

OTHER PUBLICATIONS

PCT search report dated Aug. 5, 2016 in parent PCT Application PCT/AT2016/050091.

(Continued)

Primary Examiner — Monica C King
(74) Attorney, Agent, or Firm — Andrus Intellectual Property Law (57) ABSTRACT

The invention relates to a ballast (101) for lighting means, comprising an actively switched power factor correction stage (102), which is implemented in a Totem Pole boost topology, comprising a control circuit (103), which issues control signals for driving switches of the PFC stage (102), wherein the control circuit (103) is on a floating potential and galvanically isolated from a ground potential of the ballast (101).

11 Claims, 5 Drawing Sheets

(56) References Cited

U.S. PATENT DOCUMENTS

2008/0180037 A1* 7/2008 Srimuang ............ H05B 41/295
                                                    315/246
2013/0127358 A1    5/2013 Yao
2013/0257390 A1   10/2013 Jin et al.

OTHER PUBLICATIONS

European search report dated Aug. 5, 2016 in priority European Application 15173285.6.

* cited by examiner

BALLAST FOR LIGHTING MEANS

CROSS REFERENCE TO RELATED APPLICATION

The present application is the U.S. national stage application of International Application PCT/AT2016/050091, filed Apr. 12, 2016, which international application was published on Oct. 20, 2016 as International Publication WO 2016/164947 A1. The International Application claims priority to German Patent Application 10 2015 206 626.6 filed Apr. 14, 2015; European Patent Application 15173285.6 filed Jun. 23, 2015; and Austria Patent Application GM 336-2015 filed Nov. 13, 2015.

FIELD OF THE INVENTION

The present invention is in the area of electronic circuitries which may be used in converters for lighting means, such as e.g. LEDs.

BACKGROUND OF THE INVENTION

Note that the terms "ballast" and "converter" are used equivalently in the context of the specification, drawings and claims.

The invention especially relates to actively switched power factor control circuits (PFC circuits), preferably Totem Pole PFC circuits, for operating lighting means, such as e.g. one or more LED or OLED. Especially, the present invention relates to a ballast for lighting means with an actively switched power factor correction stage (PFC stage), which preferably is implemented in a Totem Pole boost topology. The invention also relates to a lighting device including such ballast.

For power-conversion circuits generally, including drivers and converters for lighting means, such as ballasts for fluorescents and high-pressure lamps or ballasts for LED-modules, it is required to limit the amount of harmonics in the current which is drawn from the voltage supply, because in many countries regulatory laws are effective in this respect. Therefore, a simple solution consisting of rectification means (bridge- or discrete rectifier diodes) plus a bulk-storage (e.g. an electrolytic capacitor) is not suited for most applications, as the harmonics in the current would exceed the benchmarks set by regulatory laws. As a solution thereto, many switching mode power supplies (SMPS) that are used in ballasts for lighting means operate in a mode, i.e. comprise a PFC circuit, in order to draw a dominantly sinusoidal current with a low harmonics content. Many different converter topologies (boost-, buck-, SEPIC-, flyback, etc.) exist that can be used for implementing a PFC circuit.

A preferred topology according to the present invention is the so-called "Totem Pole" boost topology, which offers some benefits, such as an inherent possibility to entirely avoid switching-loss on the switch-devices, thus allowing the usage of higher switching frequencies. Due to the higher switching frequencies it is possible to design a converter with smaller geometric dimensions.

Incorporation of US 2013/0257390 A1 by reference: For the description of a preferred Totem Pole PFC circuit, i.e. an actively switched PFC circuit implemented in a Totem Pole boost topology, according to the present invention the US patent application publication US 2013/0257390 A1 is incorporated herewith by reference.

Definition of "Totem Pole PFC topology": The term "Totem Pole PFC topology" as used herein refers to the PFC topology disclosed in the US patent application publication US 2013/0257390A1 and is defined as following:

The circuit comprises an AC power supply, a first half bridge arm and a second half bridge arm.

The first half bridge arm includes a first and a second switch connected in series with each other.

A second terminal of the first switch is connected to a first terminal of the second switch, and coupled to a first end of the AC power via a first inductor.

The second bridge arm includes third and fourth switches connected in series with each other.

A second terminal of the third switch is connected to a first terminal of the fourth switch and a second end of the AC power.

The third and fourth switches operate in ON/OFF states by use of a control signal having an operation frequency consistent with that of the AC power.

The on-state resistance of the third and fourth switches is lower than that of the first or second switch, thereby reducing the on-state loss of the switch and improving the operation frequency of the circuit. Since the third and fourth switches operate at the (low) operation frequency of the voltage of the AC power (about 50-60 Hz), which is very low, the switching loss and the drive loss, which are directly proportional to the operation frequency, are very small.

However, there are some drawbacks that are currently limiting the usability of Totem Pole boost topologies, such as high control effort, larger component count compared to other topologies, no easily accessible way of sensing the current through the switch and protection of the components due to a floating potential of both switch nodes etc. Namely, the Totem Pole boost topology requires driving means for switches, which are on a floating potential and are mostly on a much higher potential than the control circuitry for controlling the switches of the Totem Pole boost topology. Driver solutions for such a topology are known to those skilled in the art as "high side drivers" and usually have the disadvantage of being more complex and demanding a higher component effort compared to driver solutions for driving switches connected to ground potential (gnd).

SUMMARY OF THE INVENTION

The present invention proposes, as a solution to this problem, to have the control circuitry (control circuit) on a floating potential, i.e. not having a direct connection to a defined voltage source as especially not having a direct connection to ground potential. Furthermore the low-voltage supply of the control circuit and any potential communication- and sensing interface is also detached from the ground potential.

This has the advantage that complex driving schemes can be avoided and a simple shunt-resistor can be provided for sensing the current through the switch, wherein the shunt-resistor floats on the same potential as the control circuitry.

Therefore, in view of the fact that control circuitry for SMPS are normally ground based, which requires some means of level shifting in order to drive switches floating on higher potential, as it is the case in a Totem Pole boost topology, the present invention proposes shifting the entire control block (control circuitry/circuit) on a better suited circuit-node. Namely, as a result thereof complex driving schemes can be avoided, while the effort on the design of a floating simple low-voltage supply of the control block and level shift for a potentially required communication interface is comparably less.

As a result of the present invention the disadvantages of Totem Pole boost topologies can be reduced and, thus, this topology can be used in order to significantly increase the switching frequency. This allows using significantly smaller inductive components and, thus, allows a smaller converter-design for the same power-capability.

In detail, the present invention proposes a ballast for lighting means, comprising an actively switched power factor correction stage, which is implemented in a Totem Pole boost topology, comprising a control circuit, which issues control signals for driving switches of the PFC stage, wherein the control circuit is on a floating potential and galvanically isolated from a ground potential of the ballast.

This has the advantage that complex driving schemes for driving the switches of the PFC stage can be avoided.

According to a further aspect of the invention, the control circuit may be provided with feedback signals from the PFC stage indicating the zero crossings of the current through an inductor of the PFC stage and the current through at least one switch of switches of the PFC stage.

According to another aspect of the invention, the ballast may further comprise a low-voltage supply for the control circuit, wherein the low-voltage supply for the control circuit is on the same floating potential as the control circuit and galvanically isolated from the ground potential of the ballast.

According to a further aspect of the invention, the ballast may further comprise a communication- and sensing interface which is on the same floating potential as the control circuit and galvanically isolated from the ground potential of the ballast.

According to another aspect of the invention the ballast may further comprise a shunt-resistor for sensing the current through the at least one switch, wherein the shunt-resistor is on the same floating potential as the control circuit.

This is advantageous, as the current can be easily detected by a simple shunt-resistor.

According to a further aspect of the invention the control circuit may be configured to provide the PFC stage with at least two types of control signals for driving the switches of the PFC stage.

According to another aspect of the invention the control circuit may be configured to regulate a first type of control signals for driving a first part of the switches of the PFC stage by using the feedback signals received from the PFC stage and the control circuit may be configured to provide a second type of control signals for driving a second part of the switches of the PFC stage without any regulation using the feedback signals received from the PFC stage.

According to a further aspect of the invention, the second type of control signals may have an operating frequency corresponding to the frequency of the alternating input voltage of the PFC stage.

This is advantageous, as the switching loss and drive loss of the switches of the PFC stage that are operated with the second type of control signals are very small and, thus, may be ignored.

According to another aspect of the invention, a lighting device is proposed that may comprise lighting means, such as one or more LEDs, and a ballast according to the present invention for driving the lighting means.

BRIEF DESCRIPTION OF THE DRAWINGS

For a better understanding of the present invention, embodiments will now be described by way of example, with reference to the accompanying drawings, in which.

DETAILED DESCRIPTION

Figure 1:
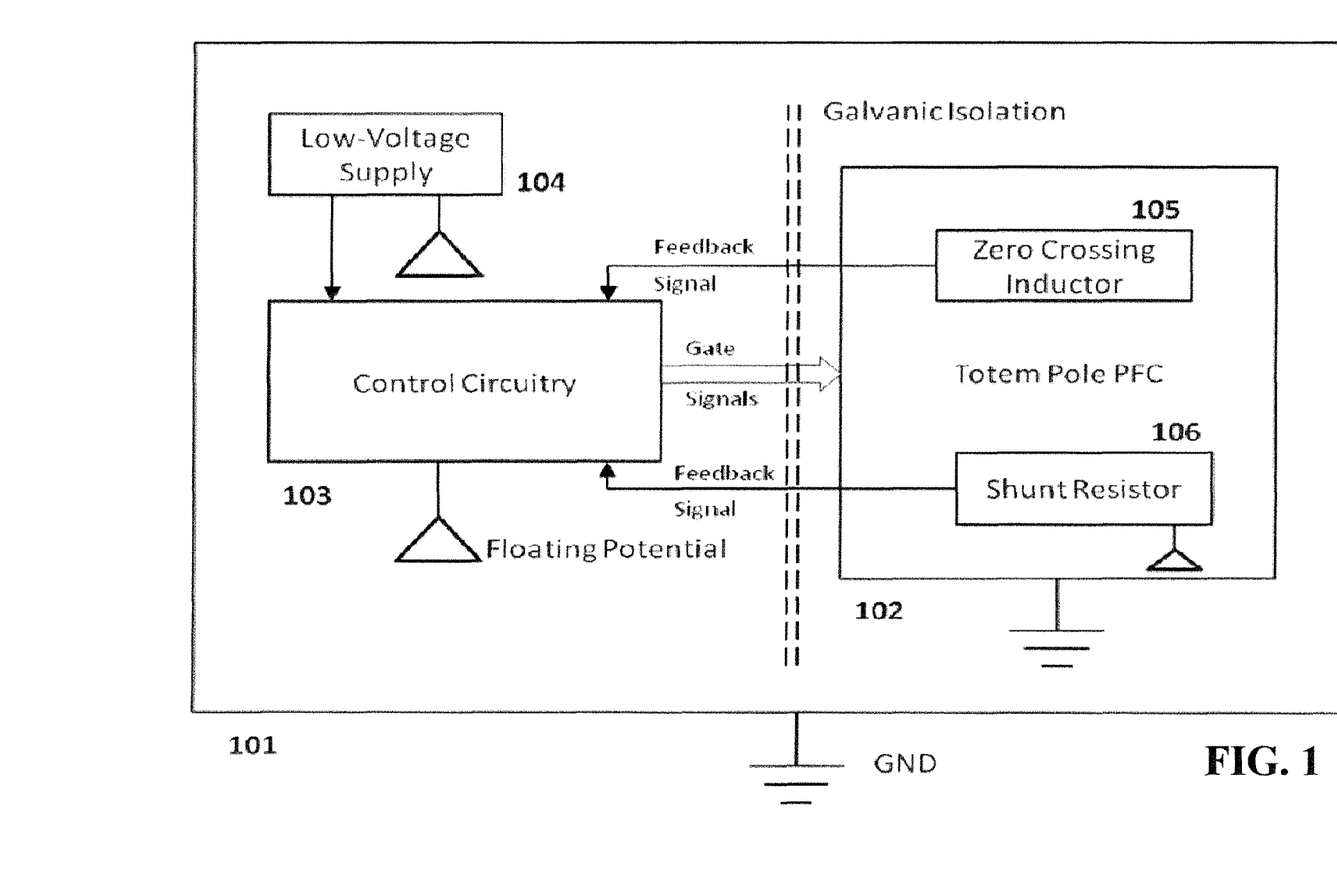
FIG. 1 shows a schematic of the ballast according to the present invention.

The first embodiment of the invention discloses a ballast 101 for lighting means (e.g. one or more LEDs) comprising an actively switched PFC circuit 102, preferably implemented in a Totem Pole boost topology, wherein the control circuitry or control circuit 103 is detached from the ground potential of the ballast 101 in order to be on a floating potential. Such ballast 101 according to the present invention is shown in FIG. 1.

In detail, the ballast 101 comprises an actively switched PFC circuit 102, which preferably is implemented in a Totem Pole boost topology respectively is a Totem Pole PFC circuit, a control circuit 103 and a low-voltage supply 104. The Totem Pole PFC circuit 102 corresponds to the Totem Pole PFC circuit of the US patent application publication US 2013/0257390 A1, which is incorporated herewith by reference. The Totem Pole PFC circuit 102 comprises a zero crossing inductor 105 for detecting the zero crossings of the current flowing through the inductor of the Totem Pole PFC circuit 102 and a shunt resistor 106 for sensing the current flowing through the switches of the Totem Pole PFC circuit 102. The shunt resistor 106 is on a floating potential and allows detecting a surge current. The detection results of the zero crossing inductor 105 and the shunt resistor 106 are provided to the control circuit 103 as feedback signals. The control circuit 103 uses the feedback signals for controlling the Totem Pole PFC circuit 102. In detail, the control circuit controls the switches of the Totem Pole PFC circuit 102 by providing control signals respectively switching signals to the switches. The switches of the Totem Pole PFC circuit 102 may be transistors and, thus, the control signals correspond to gate signals. The Totem Pole PFC circuit 102 is connected to the ground potential (GND) of the ballast 101, whereas the control circuit 103 is detached (isolated) from the ground potential of the ballast 101 and is on a floating potential. That is, the control circuit is galvanically isolated from the ground potential of the ballast 101 to be on a floating potential. The control circuit 103 is supplied with voltage from a low-voltage supply 104, which is on the same floating potential as the control circuit. The shunt resistor 106 of the Totem Pole PFC circuit 102 is on the same floating potential as the control circuit.

Since the control circuit 103 is not connected to the ground potential of the ballast 101, but is on a floating potential, the potential difference between the control circuit 103 and the switches of the Totem Pole PFC circuit 102 is reduced compared to the potential difference when the control circuit 103 is connected to the ground potential. Therefore complex driving schemes for driving the switches of the Totem Pole PFC circuit 102 can be avoided.

Figure 2:
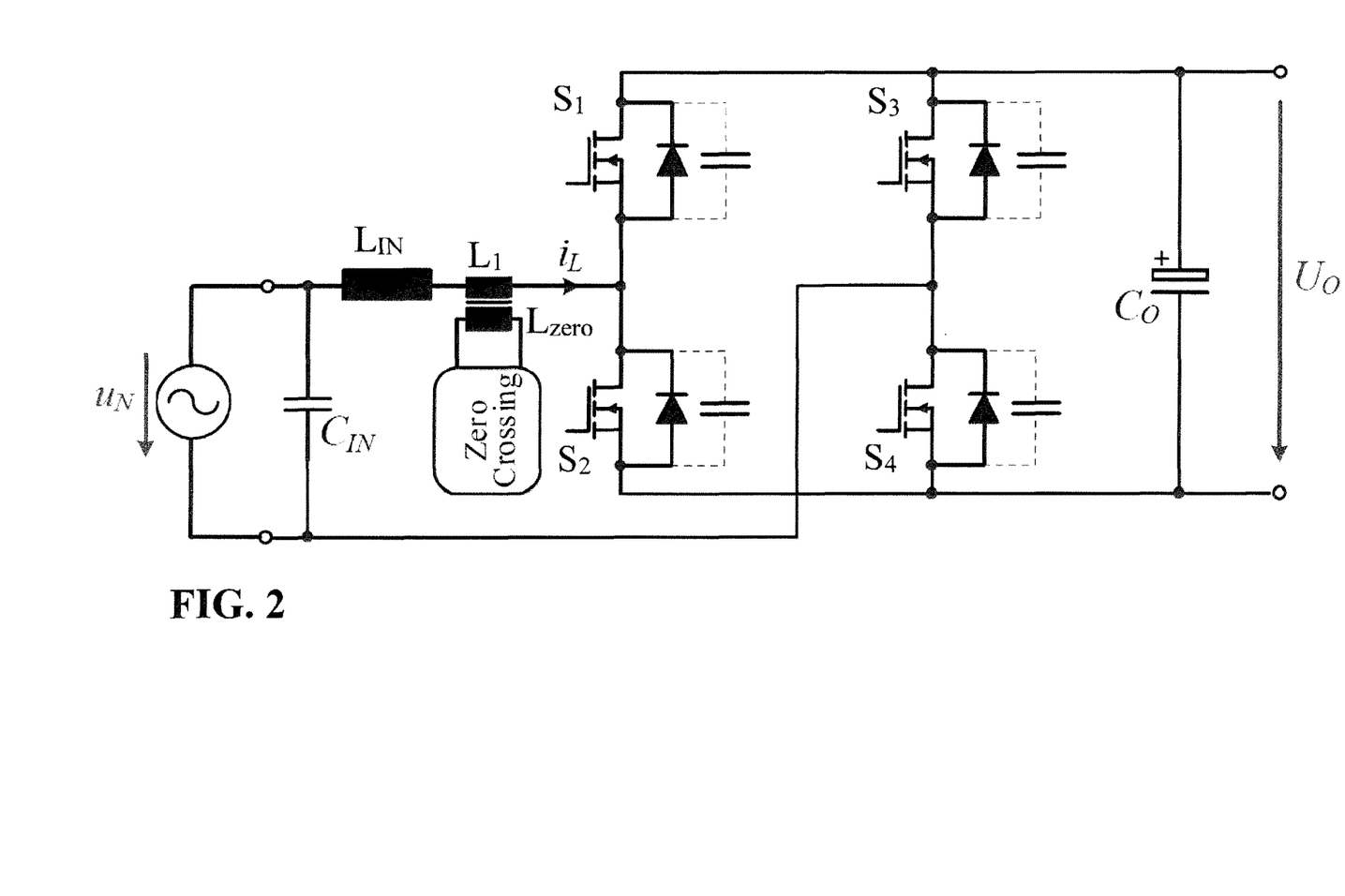
FIG. 2 shows an actively switched PFC circuit implemented in a Totem Pole boost topology.

FIG. 2 shows a Totem Pole PFC circuit of a ballast according to the present invention. The Totem Pole PFC circuit comprises an AC power supply providing the Totem Pole PFC circuit with an AC voltage $u_N$. An EMI filter including a capacitor $C_{IN}$ and an inductor $L_{IN}$ may be provided at the input of the PFC circuit. The Totem Pole PFC circuit comprises two bridge arms with a first bridge arm and a second bridge arm. The first bridge arm is a high frequency bridge arm and the second bridge arm is a low frequency bridge arm. The first bridge arm includes a first switch S1 and a second switch S2 which are connected in series to each other. A second terminal of the first switch S1 is connected to a first terminal of the second switch S2 and coupled to a first terminal of the AC power supply via a first inductor $L_1$. The zero crossings of the current $i_L$ through the first inductor $L_1$ can be detected by a secondary winding respectively inductor $L_{zero}$. The second bridge arm includes a third switch S3 and a fourth switch S4 which are connected in series to each other. A second terminal of the third switch is connected to a first terminal of the fourth switch and a second end of the AC power supply. Energy storage means, such as a capacitor $C_O$, is arranged at the output of the Totem Pole PFC circuit for providing the output voltage $U_O$.

The switches S3 and S4 of the second bridge arm (the low frequency bridge arm) are alternately commutated respectively switched at an operating frequency that corresponds to the frequency of the AC input voltage $u_N$. The switches S1 and S2 of the first bridge arm (the high frequency bridge arm) are alternately commutated respectively switched at a high operating frequency that is higher than the operating frequency of the second bridge arm.

FIGS. 3A-3D show phases of operation of a Totem Pole boost topology for the 1$^{st}$ half cycle of the AC input voltage $u_N$, i.e. the positive half cycle of the voltage waveform.

Generally, the fourth switch S4 is turned on and the third switch S3 is turned off for positive half cycles of the AC input voltage. The fourth switch S4 is turned off and the third switch S3 is turned on for negative half cycles of the AC input voltage.

Figure 3A:
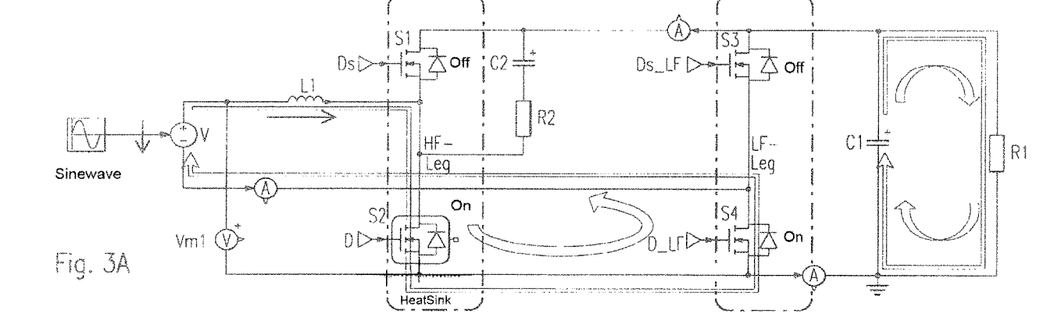
FIGS. 3A-3D show phases of operation of a Totem Pole boost topology for the 1$^{st}$ half cycle of the AC input voltage.

For positive half cycles of the voltage waveform of the AC input voltage the second switch S2 functions as a switch of a boost converter and the first switch S1 function as a diode of a boost converter, wherein the first switch S1 may carry negative currents through the inductor in dedicated phases of operation shown in FIGS. 3A-3D:

At first the second and fourth switches S2 and S4 are in the on-state and the first and third switches S1 and S3 are in the off-state, such that the inductor L1 is charged, as shown in FIG. 3A.

Figure 3B:
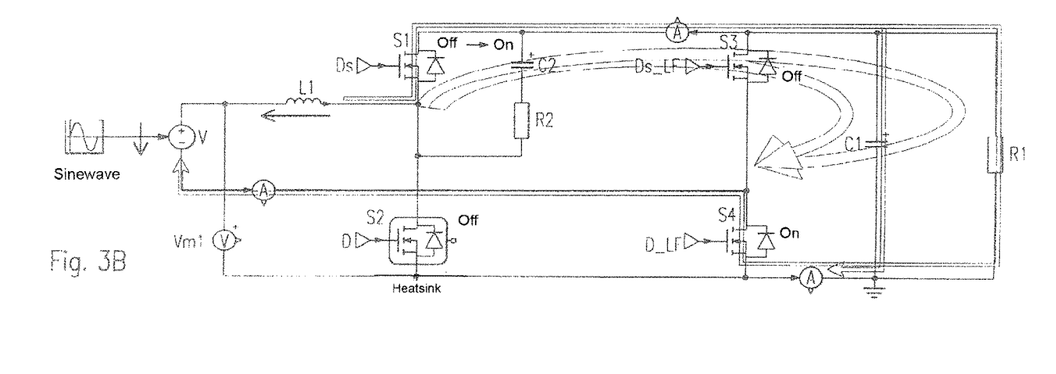

Next the first switch S1 is turned on and the second switch S2 is turned off, such that the inductor L1 charges the capacitor C1, as shown in FIG. 3B.

Figure 3C:
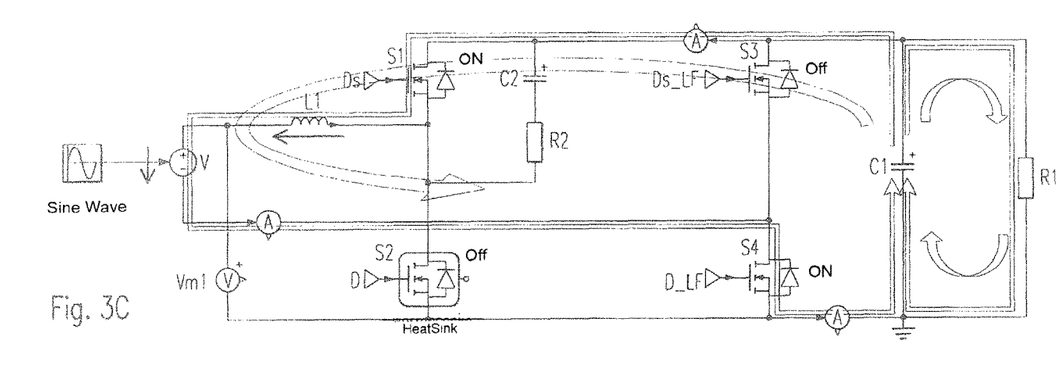

When the potential of the capacitor C1 becomes higher than the potential of the inductor L1, current flows from the capacitor C1 back to the inductor L1, as shown in FIG. 3C. This current flow stores electromagnetic energy in the inductor L1 which helps commutation of the switching-node, by discharging the parasitic capacitances of the node. As a consequence, the following switching on (turning on) of the second switch S2 (shown in FIG. 3D) occurs under zero-voltage-conditions (contrary to standard-boost) and switching losses are mostly eliminated, which is an advantage of the Totem Pole topology.

Figure 3D:
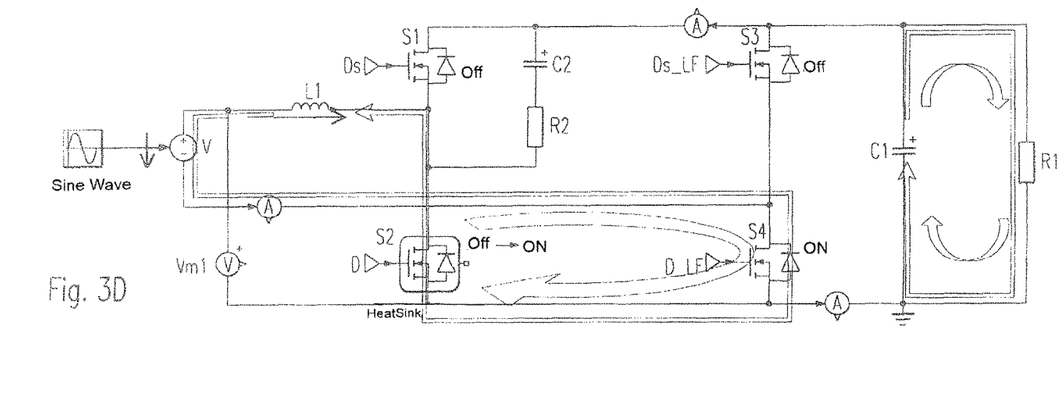

Next the second switch S2 is turned on again and the first switch S1 is turned off, such that the inductor L1 is charged again, as shown in FIG. 3D. During the phase according to FIG. 3D the electromagnetic energy stored in the inductor L1 (acting as a choke) still drives a negative current which pushes the potential of the switching-node from "high" to "low". The second switch S2 needs to be turned on after the Drain-Source-voltage of the second switch S2 has reached zero, but before the current of the inductor L1 reverses.

The third and fourth switch S3 and S4 are alternately operated with an operating frequency corresponding to the frequency of the AC voltage $u_N$, which may be about 50-60 Hz. The first and second switch S1 and S2 are also alternately operated at a high frequency, which is higher than the operation frequency of the third and fourth switch S3 and S4. The operating frequency of the first and second switch S1 and S2 is controlled by a control circuit depending on the zero crossings of the current flowing through the inductor L1 and the current flowing through the switches being detected by a shunt-resistor. The control circuit, the means for detecting the zero crossings and the shunt-resistor correspond to those already mentioned with reference to FIG. 1 and are not shown in the FIGS. 3A-3D.

Figure 4:
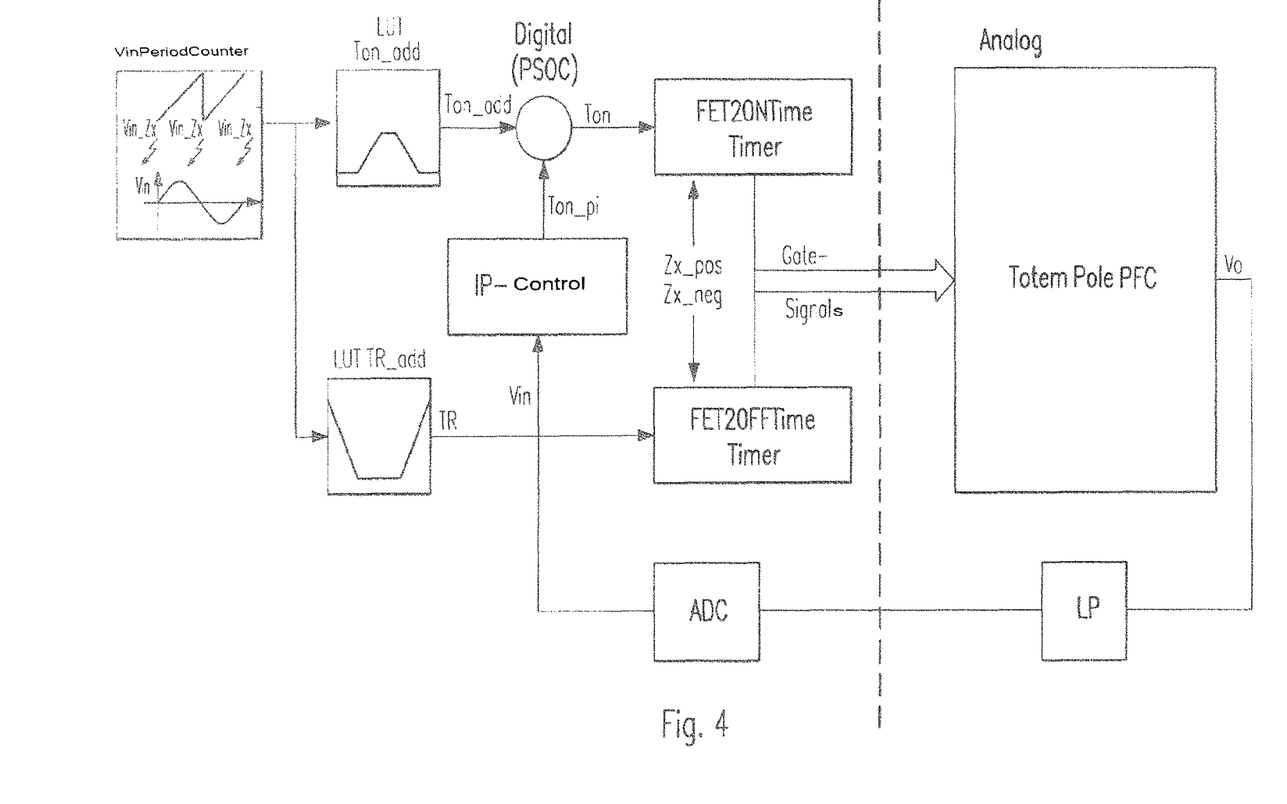
FIG. 4 shows a control loop scheme for controlling the Totem Pole boost topology.

FIG. 4 shows a control loop scheme for controlling the Totem Pole PFC circuit of the ballast according to the present invention. In detail, FIG. 4 shows a control loop scheme for controlling the on-time and off-time of the switch S2 of the Totem Pole PFC circuit as shown in FIGS. 2 and 3A-3D.

The term "on-time" (Ton_add/Ton) in the following should be understood as the time period, starting when the current through the inductor L1 and through the second switch S2 starts to become positive, until the instant when the second switch S2 is being switched off. This corresponds with the phase according to FIG. 3A. It should be noted that the actual time, during which the second switch S2 is conductive (switched "on"/turned on) is longer than the above defined on-time, as the second switch S2 is already being switched on at some time within the phase according to FIG. 3D.

The term "reverse-time" (TR) should be understood as the time, when the current through the inductor L1—while the first switch S1 is still "on" (switched "on"/turned on)—reverses and becomes negative, until the first switch S1 is switched off. This corresponds to the phase according to FIG. 3C.

Controlling the correct on- and reverse-times is made depending on the amplitude and phase-angle of the input voltage. Therefore, fast re-calculating is necessary for each high frequency cycle (HF-cycle), which may be difficult with limited calculation-power of commercially feasible PFC- or micro-controllers.

One way of controlling these times is by mostly keeping the on-time constant across more than one half cycle of the AC input voltage (AC-half-cycle), and calculating only the reverse-time once every few HF-cycles. This results in a compromise in terms of performance (switching-losses slightly larger than zero, harmonics distortion/THD not optimized).

Another way of controlling is by means of Look-Up-Tables (LUT): for both the on-times and reverse-times a dedicated LUT (or a dedicated set of LUT, if the input voltage spans a larger range, such as 100-277 VAC) is being implemented, which contain pre-calculated values of the required on- and reverse-times, depending on the phase-angle, which can be derived from an internal counter/timer and a synchronizing signal derived from AC-line (the AC input voltage). Especially for the on-times it is necessary, to correct for the fact, that near the zero-crossings of the AC input voltage (VAC-zero-crossings) the current is mostly drawn from capacitors necessary for EMI-noise suppression, and therefore the actual AC-line-current flattens out unacceptably, increasing the THD. To avoid this, on-times near the AC-line zero-crossings are being increased intentionally, which is reflected in the Ton_add-LUT.

As a consequence, both THD and switching-losses can be optimized, without the need for high calculating-powers, thus enabling commercial use by significantly reducing the cost for the control-concept of the Totem Pole PFC (TP-PFC).

The off-time corresponds to the time, during which the switch is turned off, i.e. during which the switch is in the off-state. The AC input voltage is detected by a period counter and, thus, the zero crossings of the AC input voltage may be detected. Positive (Zx_pos) and negative (Zx_neg) zero-crossings of the inductor current are being derived from a sense-winding (FIG. 2: $L_{zero}$) of the PFC-inductor (FIGS. 2 and 3A-3D: inductor L1) and used to synchronize the switching of the first and second switch S1 and S2. The positive zero-crossing Zx_pos of the inductor current corresponds to the zero-crossing, when the negative inductor current becomes positive and the negative zero-crossing Zx_neg of the inductor current corresponds to the zero-crossing, when the positive inductor current becomes negative.

The off-time of the second switch S2 is calculated by the FET2OFFTime Timer on the basis of the reverse-time TR and the value Zx_neg, wherein the reverse-time TR is obtained from a look-up table LUT TR_add based on the AC input voltage.

Namely, after the reverse-time TR starting with the time of the negative zero-crossing Zx_neg, the second switch S2 is turned on, i.e. switches from the off-state to the on-state.

The on-time Ton of the second switch S2 is calculated by the FET2ONTime Timer in a comparably slow feedback loop. Namely, the output voltage $V_O$ of the Totem Pole PFC circuit is fed back to the control circuit for calculating the on-time of the second switch S2. In detail, the output voltage $V_O$ is filtered with a low pass filter LP and then analog-to-digital converted by an analog-to-digital converter ADC to become the digital signal $V_{in}$ representing the actual value of the output voltage of the Totem Pole PFC circuit. The digital signal Vin is then compared in the IP-Control to a predefined set value $V_{DC,set}$ using a control algorithm e.g. a PI control algorithm, so as to provide the time Ton_pi. The predefined or variably adjustable on-time Ton_add, which is obtained from the look-up table LUT Ton_add based on the AC input voltage, is then combined with the time Ton_pi to provide the FET2ONTime Timer with the on-time Ton, wherein the FET2ONTime Timer is also provided with the value Zx_pos. Thus, after the on-time Ton starting with the time of the positive zero-crossing Zx_pos, the second switch S2 is turned off, i.e. switches from the on-state to the off-state.

Therefore, the FET2ONTime Timer and the FET2OFFTime Timer provide control signals respectively gate signals to the second switch S2 of the Totem Pole PFC.

The invention claimed is:

1. A ballast (101) for lighting means, comprising an actively switched power factor correction (PCF) stage (102), which is implemented in a Totem Pole boost topology, the ballast and the PFC stage being connect to ground potential, said ballast further comprising:
a control circuit (103), which issues control signals for driving switches of the PFC stage (102),
wherein the control circuit (103) is on a floating potential and is galvanically isolated from the ground potential of the ballast (101) and is galvanically isolated from the ground potential of the PFC stage (102).

2. The ballast (101) according to claim 1, in which the control circuit is provided with feedback signals from the PFC stage (102) indicating the zero crossings of the current through an inductor (105) of the PFC stage (102) and the current through at least one switch of switches of the PFC stage (102).

3. The ballast (101) according to claim 1, further comprising a low-voltage supply (104) for the control circuit (103), wherein the low-voltage supply (104) for the control circuit (103) is on the same floating potential as the control circuit (103) and galvanically isolated from the ground potential of the ballast (101).

4. The ballast (101) according to claim 1, further comprising a communication- and sensing interface which is on the same floating potential as the control circuit (103) and galvanically isolated from the ground potential of the ballast (101).

5. The ballast (101) according to claim 1, further comprising a shunt-resistor (106) for sensing the current through at least one switch in the PFC stage, wherein the shunt-resistor (106) is on the same floating potential as the control circuit (103).

6. The ballast (101) according to claim 1, wherein the control circuit (103) is configured to provide the PFC stage (102) with at least two types of control signals for driving the switches of the PFC stage (102).

7. The ballast (101) according to claim 1, wherein the control circuit (102) is configured to regulate a first type of control signals for driving a first part of the switches of the PFC stage (102) by using the feedback signals received from the PFC stage (102) and the control circuit (102) is configured to provide a second type of control signals for driving a second part of the switches of the PFC stage (102) without any regulation using the feedback signals received from the PFC stage (102).

8. The ballast (101) according to claim 7, wherein the second type of control signals have an operating frequency corresponding to the frequency of the alternating input voltage of the PFC stage (102).

9. A lighting device, comprising LED or OLED lighting means and a ballast according to claim 1 driving said lighting means.

10. The ballast (101) according to claim 1 wherein the actively switched power factor correction (PCF) stage (102) implementing a Totem Pole boost topology comprises:
an AC power supply having a first end and a second end;
a high frequency bridge arm including a first and a second switch each having a first and second terminal, the first and second switches being connected in series with each other such that the second terminal of the first switch is connected to the first terminal of the second switch, and wherein the second terminal of the first switch and the first terminal of the second switch coupled are coupled to the first end of the AC power via a first inductor;
a low frequency bridge arm includes third and fourth switches each having a first and second terminal, the third and fourth switches connected in series with each other such that the second terminal of the third switch is connected to the first terminal of the fourth switch and the second end of the AC power.

11. The ballast (101) according to claim 10 wherein the third and fourth switches operate in ON/OFF states by use of a control signal having an operation frequency consistent with that of the AC power.

* * * * *